(12) United States Patent
Skibinski et al.

(10) Patent No.: US 7,724,549 B2
(45) Date of Patent: May 25, 2010

(54) INTEGRATED POWER CONDITIONING SYSTEM AND HOUSING FOR DELIVERING OPERATIONAL POWER TO A MOTOR

(75) Inventors: Gary L. Skibinski, Milwaukee, WI (US); John Wilkins, Broken Arrow, OK (US); Rick Hoadley, Mequon, WI (US); Nick Guskov, Mequon, WI (US); Dennis Braun, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 620 days.

(21) Appl. No.: 11/534,539

(22) Filed: Sep. 22, 2006

(65) Prior Publication Data

US 2008/0074074 A1 Mar. 27, 2008

(51) Int. Cl.
*H02J 1/02* (2006.01)
*H02M 1/12* (2006.01)
(52) U.S. Cl. .......................................... 363/39
(58) Field of Classification Search ............... 363/34, 363/37, 39–41; 307/105
See application file for complete search history.

(56) References Cited

U.S. PATENT DOCUMENTS 4,339,706 A * 7/1982 Kusko ..................... 323/248
6,208,537 B1 3/2001 Skibinski et al.
2004/0184292 A1* 9/2004 Knox ......................... 363/58

* cited by examiner

*Primary Examiner*—Bao Q Vu
*Assistant Examiner*—Jue Zhang
(74) *Attorney, Agent, or Firm*—Quarles & Brady LLP; Alexander R. Kuszewski; John M. Miller

(57) ABSTRACT

A device for conditioning power delivered to operate a motor is disclosed. The device includes a sealed housing having at least one input terminal extending through the housing and configured to receive an input power and at least one output terminal extending through the housing and configured to deliver an output power conditioned to power a motor coupled to the output terminal. The device also includes a filter inductor arranged in the housing and that has an input configured to receive the input power from the input terminal. The filter inductor output terminal has a tap that is extended through the housing to allow coupling of various external filter components, such as resistors capacitors and inductors. Accordingly, the filter inductor is configured to suppress voltage changes in the input power and deliver a filtered power to an output of the filter inductor. A transformer is included that is arranged in the housing and has an input configured to receive the filtered power from the output of the filter inductor. As such, the transformer is at least configured to electrically isolate the input terminal from the output terminal and deliver a conditioned power from an output of the transformer to the output terminal to power the motor coupled to the output terminal.

27 Claims, 14 Drawing Sheets

INTEGRATED POWER CONDITIONING SYSTEM AND HOUSING FOR DELIVERING OPERATIONAL POWER TO A MOTOR

CROSS-REFERENCE TO RELATED APPLICATIONS STATEMENT REGARDING FEDERALLY

--

SPONSORED RESEARCH OR DEVELOPMENT

--

BACKGROUND OF THE INVENTION

The present invention relates generally to power conditioning systems for driving motors and, more particularly, to an integrated power conditioning system for delivering power suitable for driving a motor that may be enclosed in a common housing.

Power plants are linked to power consuming facilities (e.g., buildings, factories, etc.) via utility grids designed so as to be extremely efficient in delivering massive amounts of power. To facilitate efficient distribution, power is delivered over long distances as fixed frequency three-phase alternating current (AC) power.

Despite being efficiently distributable, fixed frequency AC power is often not suitable for end use in consuming facilities. In many applications, the power delivered by the utility must be converted or "conditioned" to a useable form. For example, motors and their associated loads are one type of common inductive load employed at many consuming facilities that require power conditioning.

To this end, typical power "conditioning" systems configured to condition power for motor systems include AC-to-DC (direct current) rectifiers that convert the utility AC power to DC power applied to positive and negative DC buses (i.e. across a DC link) and an inverter linked to the DC link that converts the DC power back to three-phase AC power having a form suitable to a desired application. A controller controls the inverter in a manner calculated to provide power having a waveform desired for consumption.

Specifically, the inverter includes a plurality of switches that can be controlled to link and unlink the positive and negative DC buses to motor supply lines. The linking-unlinking sequence causes voltage pulses on the motor supply lines that together define alternating voltage waveforms. When controlled correctly, by a pulse width modulator (PWM) controller, the waveforms cooperate to generate a rotating magnetic field inside the motor stator core. In an induction motor, the magnetic field induces a field in motor rotor windings. The rotor field is attracted to the rotating stator field and thus the rotor rotates within the stator core. In a permanent magnet motor, one or more magnets on the rotor are attracted to the rotating magnetic field. The rectifier, inverter, and control circuitry are commonly referred to as a motor drive unit.

The output of the motor drive unit often includes an output filter in the form of a reactor designed to reduce the peak voltages applied to the motor terminals so that reflected waves are controlled or reduced. These filters are particularly important when the distance between the output of the motor drive unit and the motor input is significant because power stability issues raised by reflected waves are further exacerbated over these long distances.

Beyond filters, it is often desirable to include a transformer between the filter and the motor inputs to isolate the motor from the utility supply and/or to step up or step down the fundamental voltage supplied by the motor drive unit to be usable by the motor. Furthermore, the transformer may be used to reduce common mode noise present on the motor supply lines.

In this regard, for convenience and serviceability, industrial/commercial motor systems are typically separated into two localities. First, the motor drive unit and filter are generally located in an area near the location where the utility lines deliver power to the facility housing the motor system. In this regard, by arranging the majority of the power "conditioning" components (i.e. motor drive unit, filter, and the like) at a centralized location near the terminal end of the utility lines, human exposure to these high power components can be reduced and servicing procedures streamlined. Second, the transformer and motor are generally located in an area proximate to the motor load. By localizing the transformer and motor components near the motor load, power losses associated with delivering power in a form suitable for driving the motor over long distances are reduced.

BRIEF SUMMARY OF THE INVENTION

The present invention improves upon the above-described systems by providing an integrated power conditioning system for delivering power suitable for driving a motor that may be enclosed in a common housing. In particular, while the motor drive unit may still be arranged separately from the motor and motor load, the filter and transformer may be arranged together in a single housing. Hence, various cost, size, and power consumption savings can be realized. To realize further savings, the filter and transformer may share a common core.

In accordance with one aspect of the invention, a device for conditioning power delivered to operate a motor is disclosed. The device includes a sealed housing having at least one input terminal extending through the housing and configured to receive an input power and at least one output terminal extending through the housing and configured to deliver an output power conditioned to power a motor coupled to the output terminal. The device also includes a filter arranged in the housing and that has an input configured to receive the input power from the input terminal. Accordingly, the filter is configured to suppress voltage changes in the input power and deliver a filtered power to an output of the filter. A transformer is included that is arranged in the housing and has an input configured to receive the filtered power from the output of the filter. As such, the transformer is at least configured to electrically isolate the input terminal from the output terminal and deliver a conditioned power from an output of the transformer to the output terminal to power the motor coupled to the output terminal.

In accordance with another aspect of the invention, a power conditioning device configured to deliver power condition to drive a motor is disclosed. The device includes a filter having a plurality of windings extending from an input configured to receive unconditioned power to an output configured to deliver filtered power. The plurality of windings is configured to suppress voltage changes in the unconditioned power. The device also includes a transformer that has a set of primary windings configured to receive the filtered power from the output of the filter and a set of secondary windings electrically isolated from the primary windings to deliver a conditioned power to power a motor coupled thereto. The device also includes a shared metal core extending through plurality of windings of the filter and the primary windings and secondary windings of the transformer.

In accordance with yet another aspect of the invention, a device for conditioning power delivered to operate a motor is disclosed that includes a housing having an interior and an exterior. The housing also includes at least one input terminal extending from the interior to the exterior to receive an input power and at least one output terminal extending from the interior to the exterior to deliver an output power conditioned to power a motor coupled to the output terminal. The device also includes a reactor arranged in the interior of the housing and that has an input configured to receive the input power from the input terminal. The reactor is configured to suppress voltage changes in the input power and deliver a filtered power to an output of the reactor. A transformer is included that is arranged in the interior of the housing and has an input configured to receive the filtered power from the output of the reactor. In this regard, the transformer is at least configured to electrically isolate the input terminal from an output terminal and deliver a conditioned power from an output of the transformer to the output terminal to power the motor coupled to the output terminal. Additionally, the device includes a common metal core extending through the reactor and the transformer to couple magnetic flux therebetween.

Various other features of the present invention will be made apparent from the following detailed description and the drawings.

DETAILED DESCRIPTION OF THE INVENTION

Figure 1:
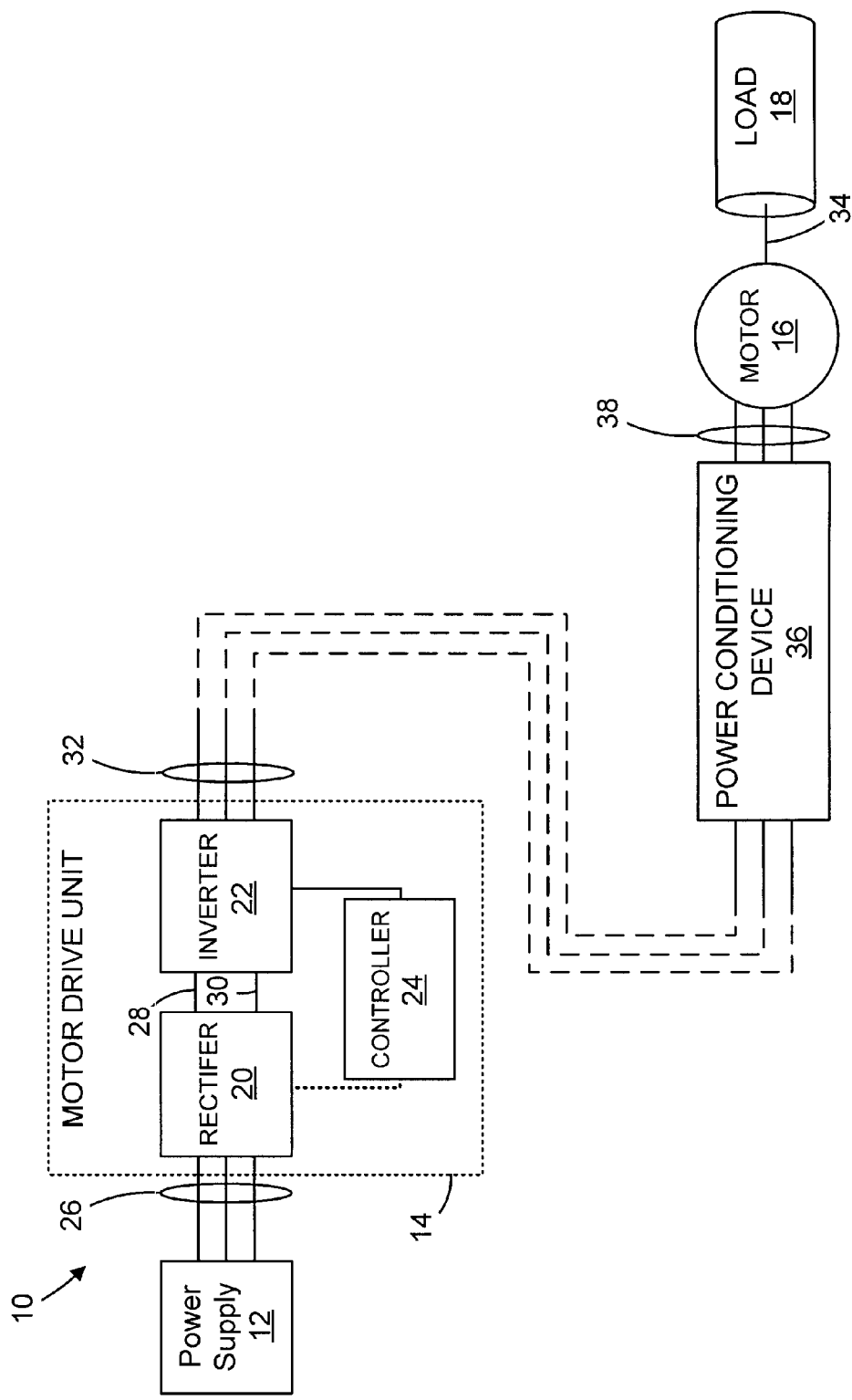
FIG. 1 is a schematic representation of a motor system including a power conditioning device in accordance with the present invention.

Referring now to FIG. 1, the present invention will be described in the context of a motor control system 10. The motor control system 10 includes a power supply 12 and a motor drive unit 14. The power supply 12 provides power to the motor drive unit 14 that, in turn, converts the power to a more usable form for a three-phase motor 16 that drives an associated load 18.

The motor drive unit 14 includes variety of components, such as a rectifier 20, an inverter 22, and a controller 24. During operation, the power supply 12 provides three-phase AC power, for example, as received from a utility grid over transmission power lines 26. However, it is also contemplated that the power supply 12 may be designed to deliver single-phase power. In either case, the nominal line voltage delivered by the power supply 12 is dependent on the particulars of the motor 16, load 18, and power available to the power supply 12 to drive the motor drive 14. For example, as addressed above, the power supply 12 may be a transmission power receptacle, in which case, the power available to the motor control system 10 will be dependent upon the specifics of the geographic region in which the motor control system 10 is located (e.g. 50 Hz/60 Hz or 220 V/380V).

Accordingly, the rectifier 20 is designed to receive AC power from the power supply 12 and convert the AC power to DC power. It is contemplated that various types of rectifiers may be employed to convert the AC power to DC power. For example, some rectifiers, such as a pulse width modulated (PWM) rectifier, are active and include a plurality of switching transistors. PWM rectifiers may be advantageously employed where energy present in the motor windings is regeneratively supplied back to the power supply 12 when the motor 16 is disconnected.

On the other hand, a passive rectifier, such as a multiple phase (e.g., 6, 18, or 24) diode rectifying bridge used in conjunction with a bus capacitor and filters, could be used that would not require input from the controller 24. In the case of a passive rectifier, power may be dissipated in braking resistors (not shown) coupled across the motor windings when the motor 16 is disconnected.

In either case, the inverter 22 is positioned between positive and negative DC buses 28, 30 of the rectifier 20 output. As is well known in the motor control arts, the inverter 22 includes a plurality, for example, six switching devices (e.g., BJTs and the like) that are positioned between the positive and negative DC buses 28, 30 and output supply lines 32 of the inverter 22, such that the PWM controller 24 can open and close specific combinations of the switches to sequentially generate positive and negative DC voltage pulses on each of the supply lines 32. By opening and closing the switches of the inverter 22 in specific sequences, the motor drive unit 14 generates AC power having controllable amplitudes and frequencies on each of the supply lines 32.

Ideally, each of the lines 32 is linked to a separate one of three-phase windings of the motor 16. By providing known sequences of AC power across the motor windings, the motor 16 is driven to turn a drive shaft 34 that, in turn, drives the load 18. However, in actuality, it is often necessary to include additional power conditioning components between the output of the inverter 22 and the input of the motor 16. As; will be described below, the present invention includes a consolidated power conditioning device 36 that provides a variety of additional power conditioning functions, such as filtering and isolation to protect against voltage waves created by the inverter 22 and reflected by the motor 16. In particular, one device is created that reduces changes in the voltage supplied to a motor, which reduces peak voltage induced by reflected waves.

Furthermore, the additional power conditioning device 36 can be configured to step up or step down the voltage supplied from the inverter 22 to be more suitable for use by the motor 16. In this regard, a step-up configuration will be described, that includes a power source from the inverter 22, which may be designed to deliver low-voltage (e.g., less than 600V), high-current power. The power conditioning unit 36, which is typically located proximate motor drive unit 14, may be configured as a step-up voltage transformer to provide power to a medium voltage motor and load a significant distance away. The power conditioning unit 36 may employ taps to compensate for the voltage drop and losses associated with transmitting the power over significant distances, such as power lines 38 extending from the power conditioning unit 36 to the motor 16 and load 18. A similar configuration and description for a step-down transformer configuration is also contemplated.

Figure 2:
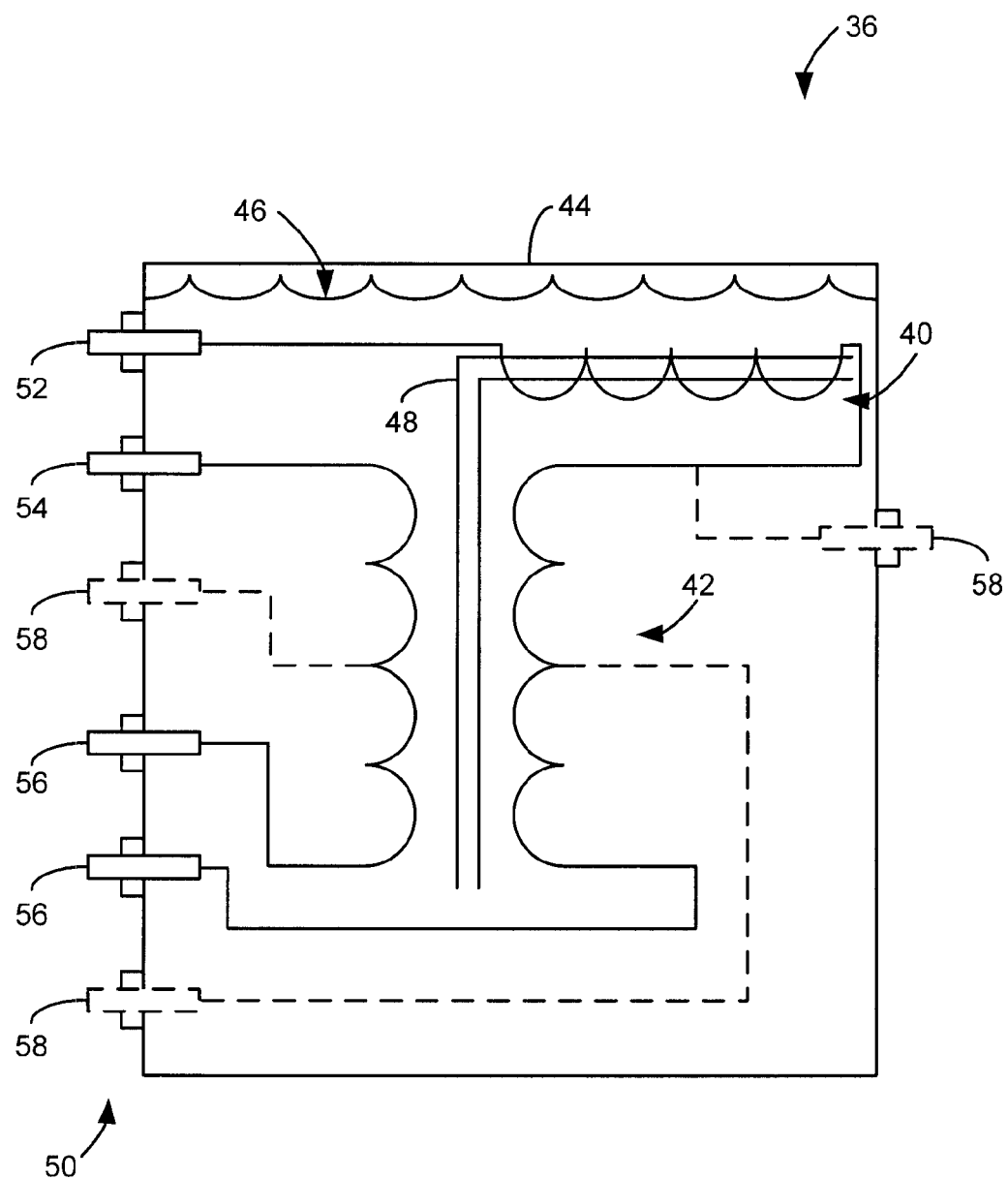
FIG. 2 is a cross-sectional and schematic view of a single phase portion of the power conditioning device of FIG. 1 having an integrated filter and transformer device arranged in a common housing.

Referring now to the single phase circuit representation in FIG. 2, the power conditioning device 36 includes a filter inductor 40 and a transformer 42 arranged within a common housing 44. The housing 44 may also hold an insulating and heat conducting material and/or dielectric 46. For example, it is contemplated that the material 46 may include oil or the like. Additionally, as will be described in greater detail below, it is contemplated that the filter inductor 40 and transformer 42 share a common core 48, such as an iron or other flux coupling core.

By arranging the filter inductor 40 and transformer 42 in a common housing 44 a number of advantages are achieved over traditional systems employing filters and transformers located separately, and often in differing localities. First, as shown in FIG. 2, the filter inductor 40 is immersed in insulating and heat conducting materials 46 that are not typically available to the filter inductor 40 but commonly used with the transformer 42. Accordingly, cooling systems, such as fans and the like, and the associated enclosures that are often employed to cool a separately located filter are not necessary. Second, by arranging the filter inductor 40 within a sealed housing 44 along with the transformer 48, the filter inductor 40 is protected from the elements and; thus, the operational life of the filter inductor 40 is extended. Furthermore, by arranging the filter inductor 40 and transformer 42 in a common locality and within a common housing 44, it is possible to easily reconfigure the system for varying input and output power requirements.

For example, in accordance with one embodiment, it is contemplated that a plurality of taps 50 may be provided that extends from the housing 44. In this regard, beyond input and output taps 52, 54 and neutral taps 56, additional reconfiguration taps 58 may be included that enable a user to quickly change/adjust the configuration of the system.

For example, as shown, additional taps 58 may be included that provide access to center taps on the transformer 42 to change input and output characteristics and/or compensate for variations in the reactance of the filter inductor 40. However, it is contemplated that a wide variety of taps beyond those illustrated in FIG. 2 may be included to enable ready reconfiguration of the device 36 by selecting different tap configurations. For example, the additional taps 58 may be designed to step-up or step-down (or neither) the voltage supplied to the motor, as dictated by a given application.

Figure 3:
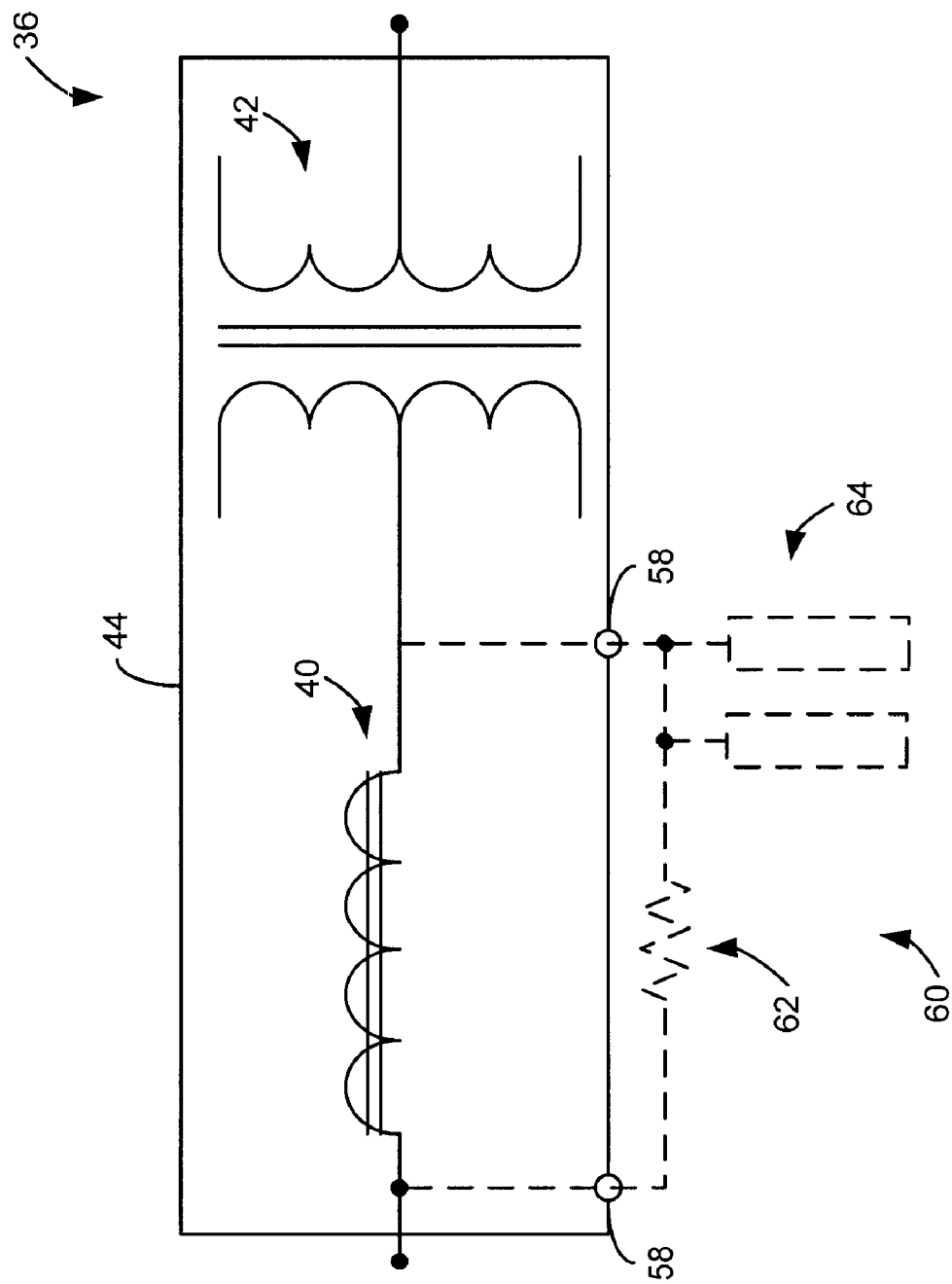
FIG. 3 is a single phase circuit diagram representation of the integrated filter and transformer device of FIG. 2, showing basic input and output terminations and additional terminations that include additional filtering and damping components external to the housing.

Additionally, it is contemplated that other taps may be provided that are designed to receive additional filters, such as capacitors. For example, referring to FIG. 3, which shows a single phase representation of power conditioning unit 36, it is contemplated that a variety of additional taps 58 may be included to enable user-selection of a variety of electrical configurations between the filter inductor 40, the transformer 42, and any additional filters 60, such as additional capacitive or inductive filters or even resistive elements. In this regard, desired configurations may include a resistor arranged in parallel with the line reactor filter inductor 40 to reduce reflected wave voltage spikes and reduce common mode noise currents, such as described in commonly assigned U.S. Pat. No. 5,990,654, entitled "Apparatus for Eliminating Motor Voltage reflections and Reducing EMI currents", which is incorporated herein by reference. It may also include the use of a plurality of additional components 64 forming sections of tuned circuits. Such tuned sections of circuits may include series-resonant, sine-wave filters, such as described in commonly assigned U.S. Pat. No. 6,208,537, entitled "Series Resonant Sinewave Output Filter and Design Methodology," which is incorporated herein by reference. These tuned sections function to wave shape the discrete positive and negative PWM voltage pulses of the inverter 22 at the filter inductor 40 input. Accordingly, a sine wave voltage at fundamental output frequency of the inverter 22 is transferred to the input of the transformer 42.

In other cases, it is contemplated that the additional components 64 may simply include capacitors connected in a delta or wye configuration for use with a drive voltage source inverter topology. For example, referring to a three phase schematic of components connected/integrated with the filter/housing 44 in FIGS. 4a and 4b, two such LC filter configurations are shown where the additional components 64 are capacitors connected through the additional taps 58 in a wye configuration and a delta configuration, respectively.

Figure 4A:
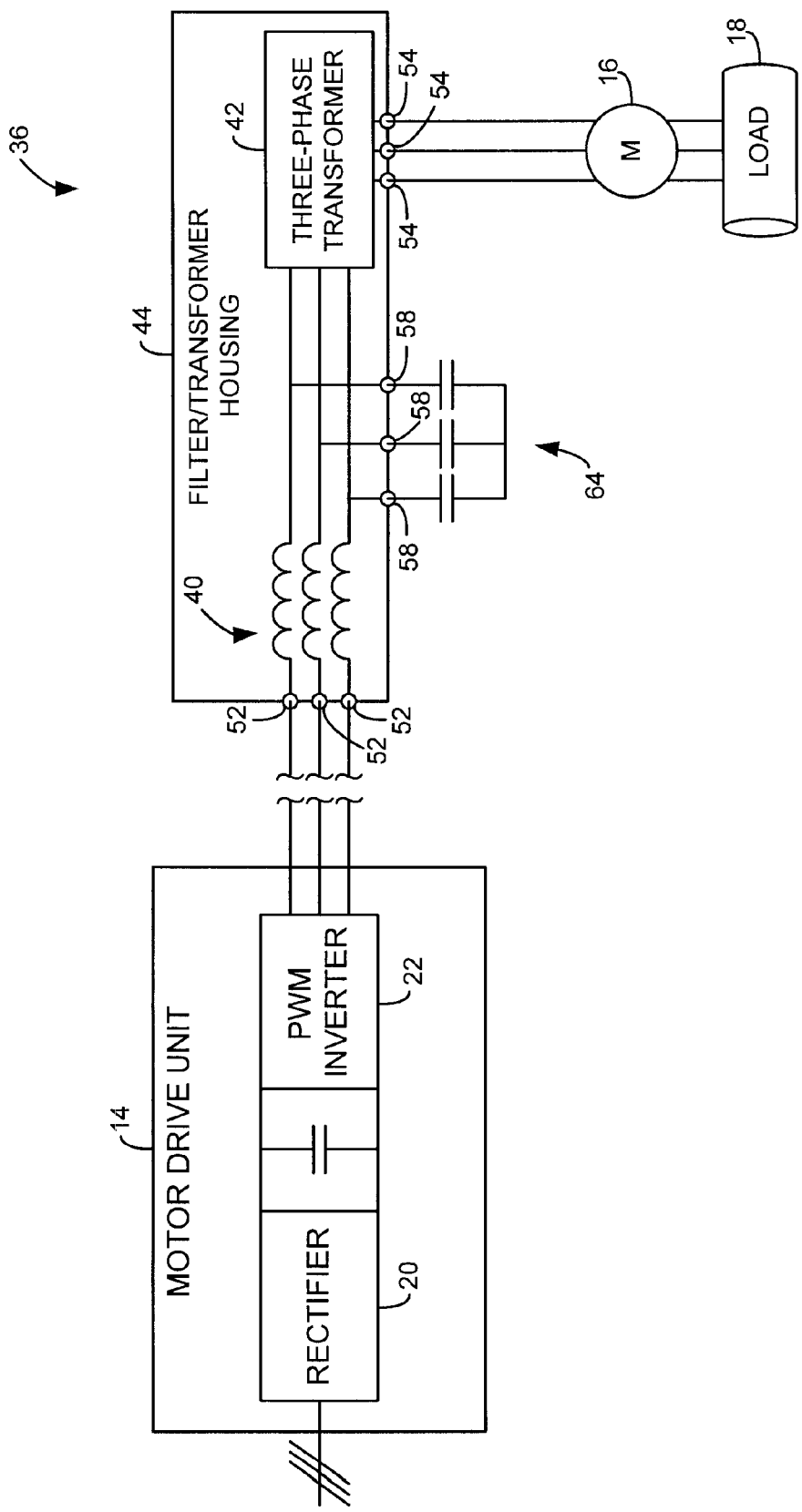
FIG. 4a is a circuit diagram of the integrated filter and transformer device of FIG. 1 shown in a three-phase application and including an inductor-capacitor filter having a wye capacitor configuration.
Figure 4B:
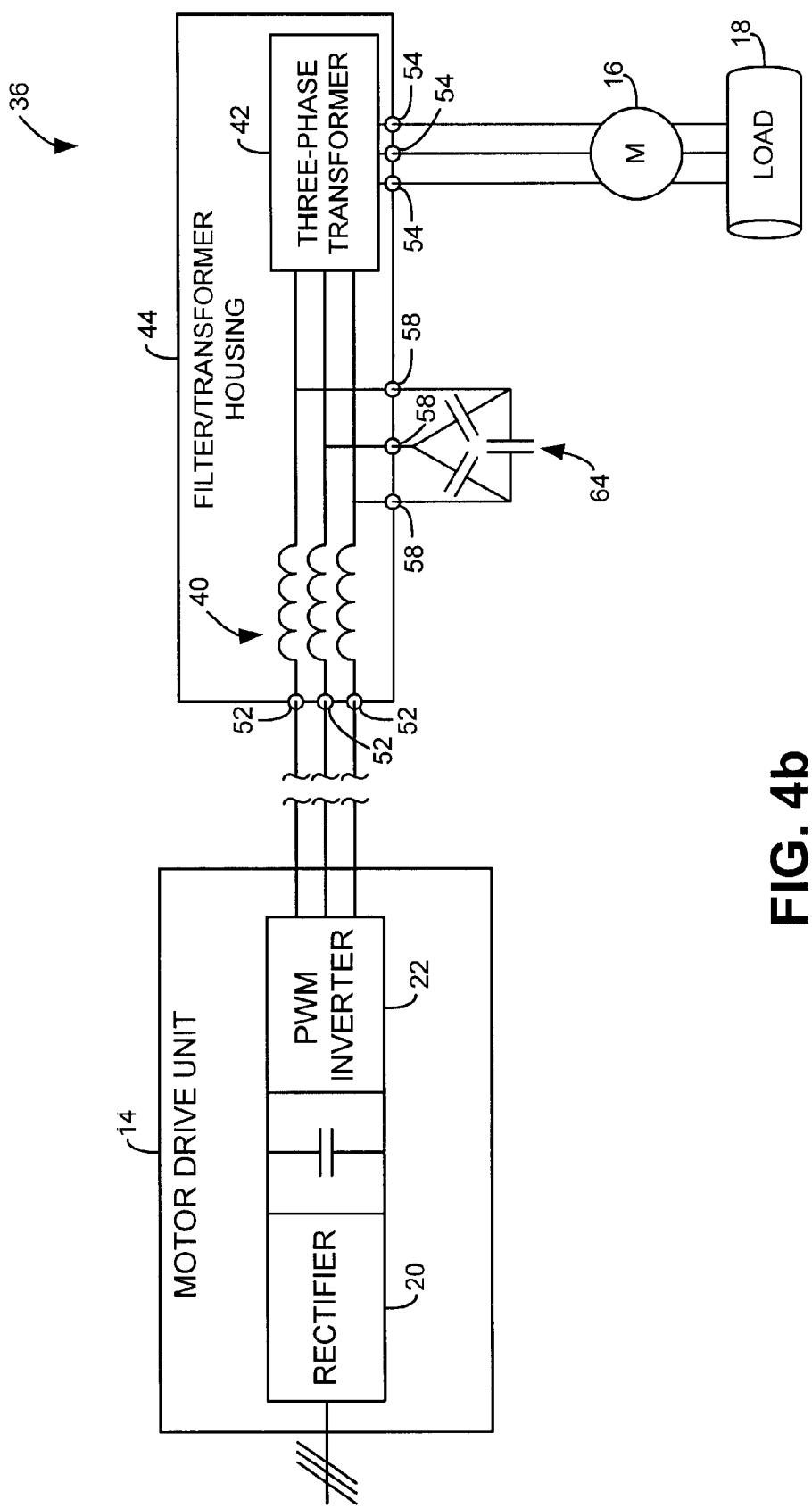
FIG. 4b is a circuit diagram of the integrated filter and transformer device of FIG. 1 shown in a three-phase application and including an inductor-capacitor filter having a delta capacitor configuration.
Figure 5A:
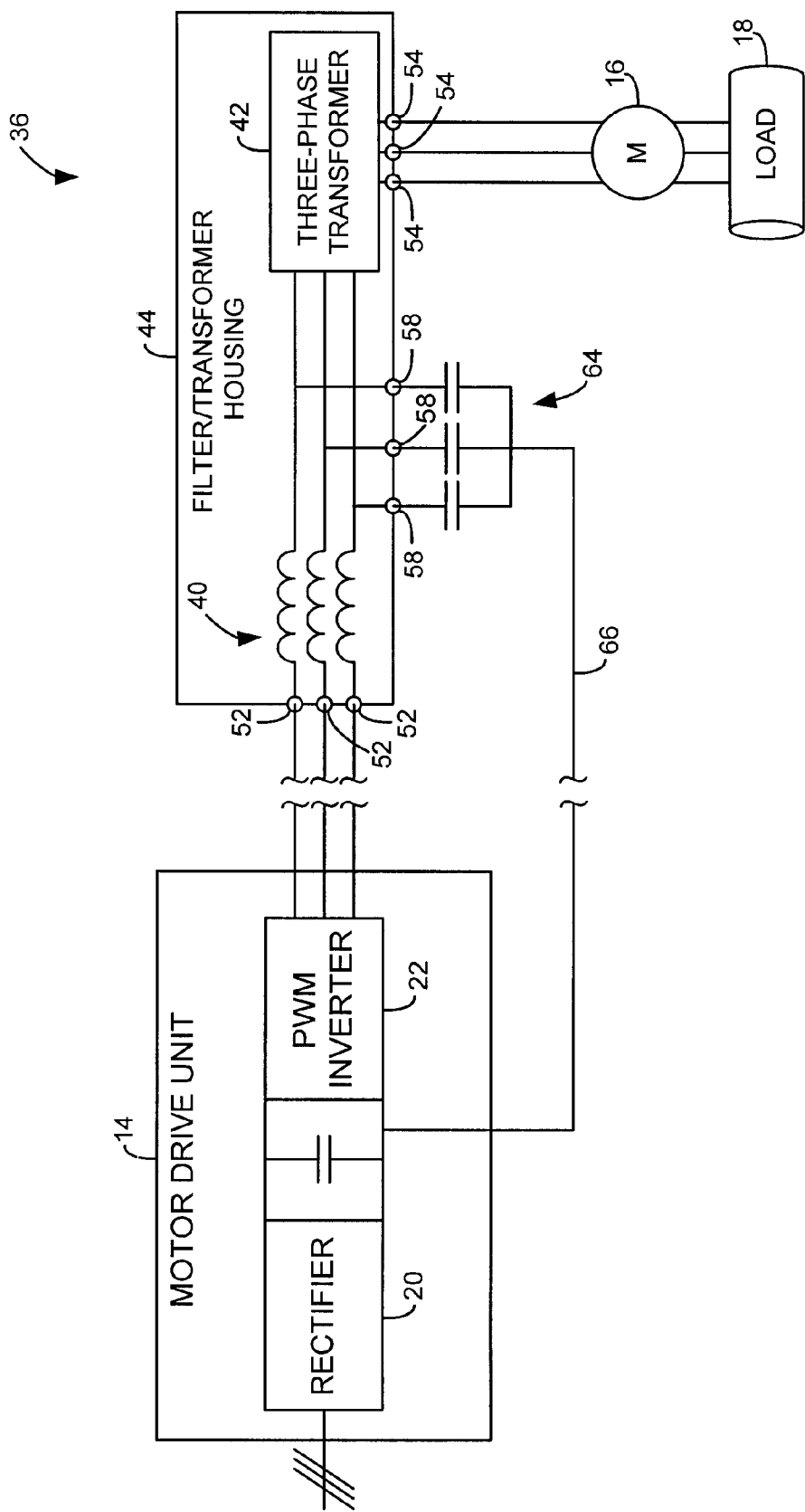
FIG. 5a is a circuit diagram of the integrated filter and transformer device of FIG. 1 shown in a three-phase application and including an inductor-capacitor filter having a wye capacitor configuration and a feedback loop.
Figure 5B:
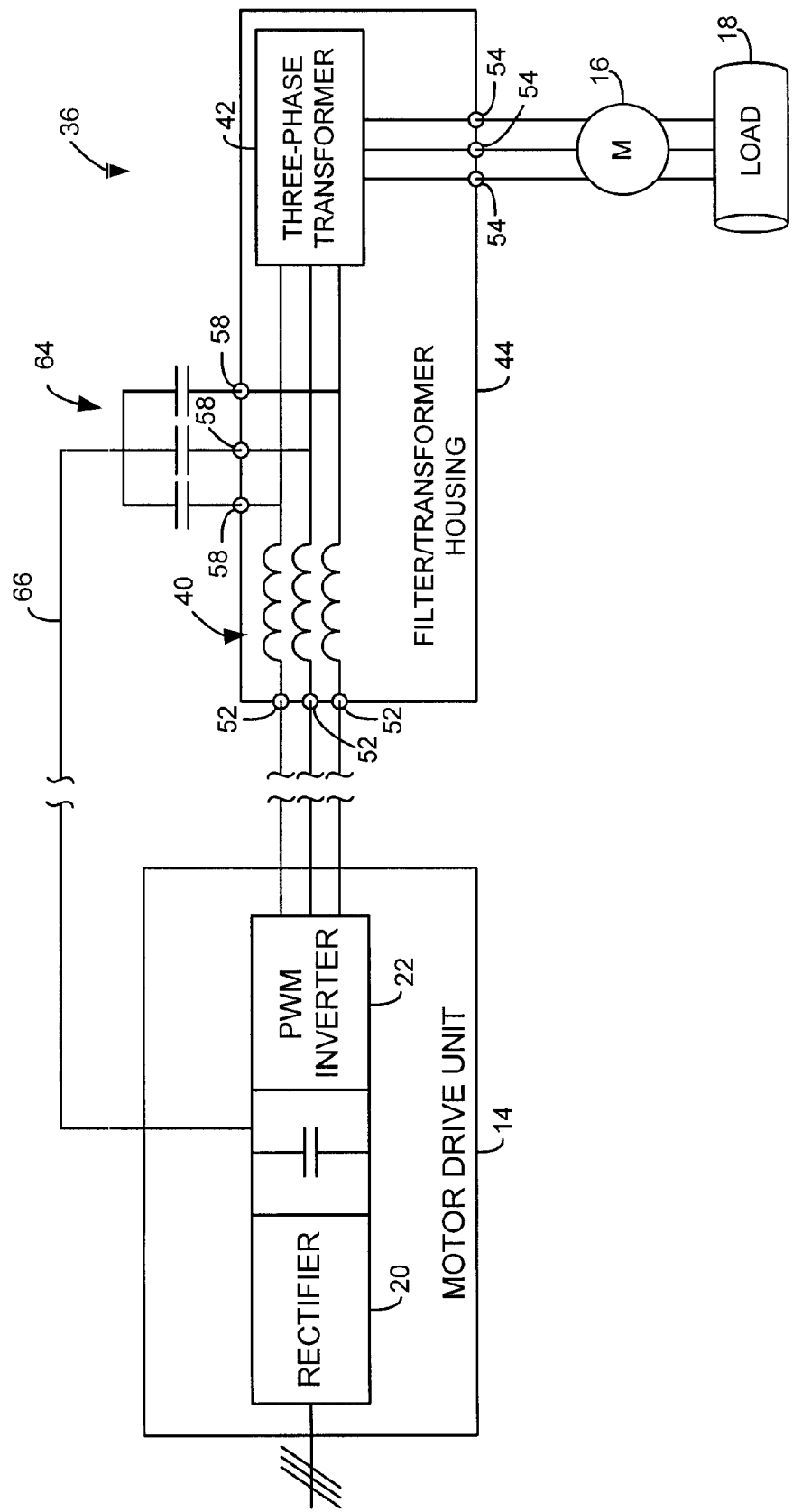
FIG. 5b is a circuit diagram of the integrated filter and transformer device of FIG. 1 shown in a three-phase application and including an inductor-capacitor filter having a wye capacitor configuration and another feedback loop configuration.
Figure 5C:
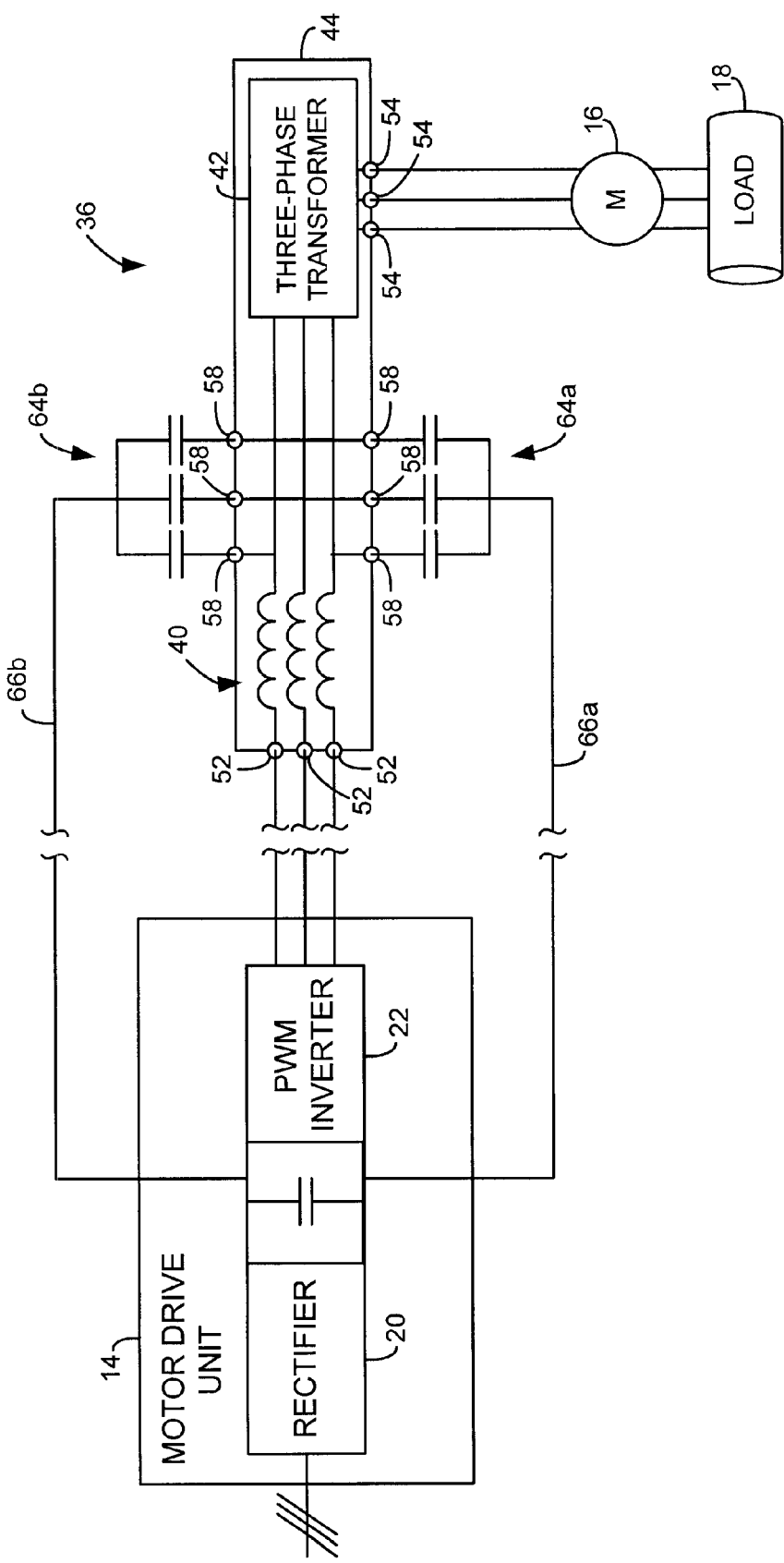
FIG. 5c is a circuit diagram of the integrated filter and transformer device of FIG. 1 shown in a three-phase application and including an inductor-capacitor filter having a wye capacitor configuration and a pair of feedback loops.
Figure 5D:
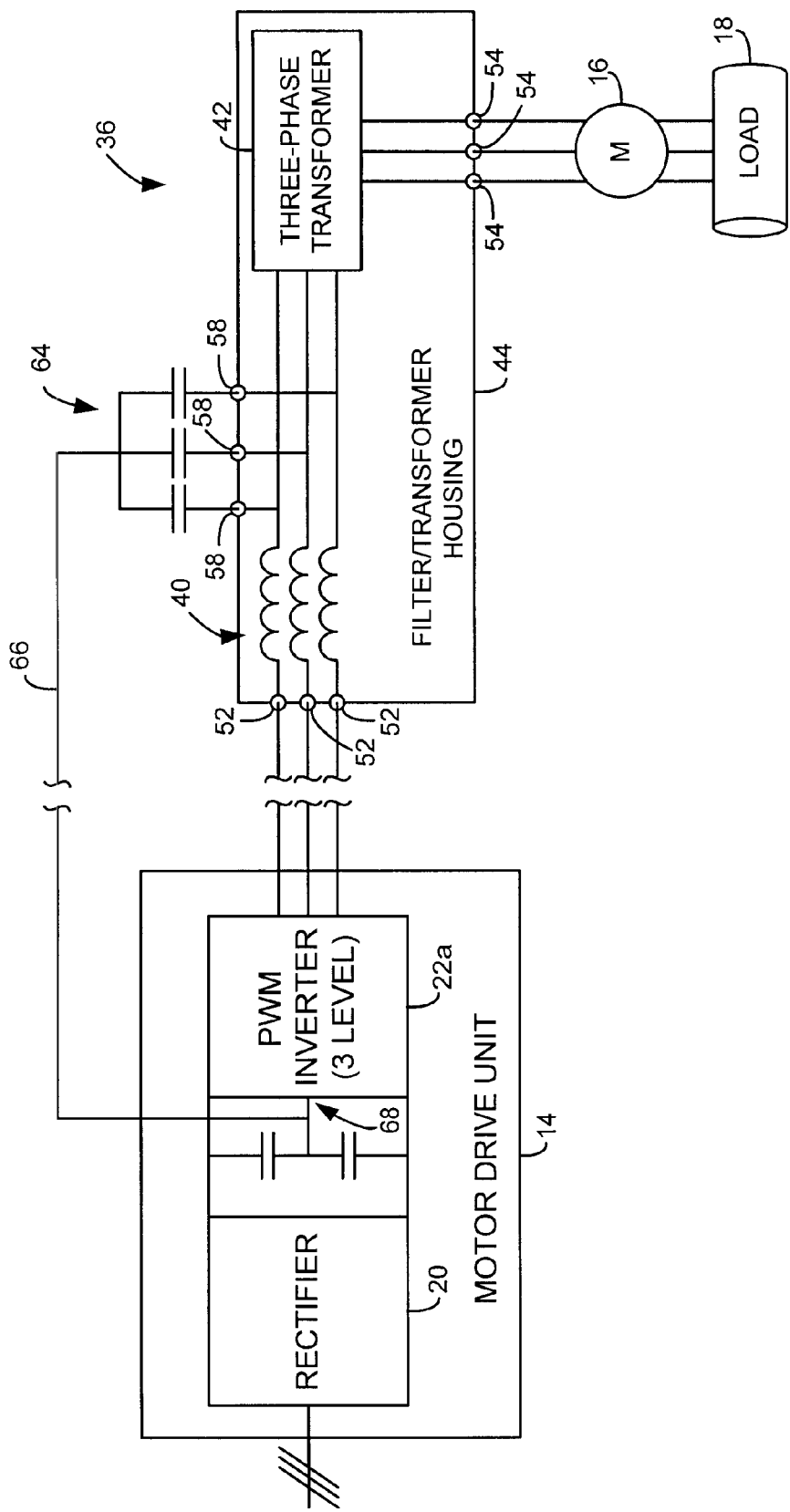
FIG. 5d is a circuit diagram of the integrated filter and transformer device of FIG. 1 shown in a three-phase application and including an inductor-capacitor filter having a wye capacitor configuration and another feedback loop configuration.

Furthermore, building upon the configurations shown in FIGS. 4a and 4b and referring now to FIGS. 5a through 5d, it is contemplated that various feedback loops may be included to improve system stability, improve line-ground voltage wave shape, or reduce further common mode noise. For example, in FIG. 5a a feedback loop 66 extends from the set of wye configured capacitors arranged as the additional components 64 to the negative DC bus 30 of the rectifier 20 output. However, as shown in FIG. 5b, it is also contemplated that the feedback loop 66 may extend to the positive DC bus 28 of the rectifier 20 output or, as shown in FIG. 5c, two sets of additional components 64a, 64b may be connected to the additional taps 58 that include corresponding feedback loops 66a, 66b extending to the positive DC bus 28 and the negative DC bus 30, respectively. Also, referring to FIG. 5d, a three-level PWM inverter including multiple switches (e.g., twelve switches) and multiple diodes (e.g., eighteen) with a neutral clamp point brought out 22a may be used, whereby the feedback loop 66 can be designed to extend between the additional components 64 and an input 68 to the three-level PWM inverter 22a between the positive DC bus 28 and the negative DC bus 30. Alternatively, a feedback loop 66 may be returned to a two level PWM inverter, whereby the feedback loop 66 is connected to the midpoint of the DC Bus capacitor bank. In this case, the feedback loop 66 is connected to the neutral wye connection point of capacitor components 64, which is brought to near zero voltage to thereby reduce common mode voltage further.

Within each of the configurations described with respect to FIGS. 5a-5d it is contemplated that a wide variety of variations may be used. For example, delta configurations, floating wye neutrals, high resistance grounded wye neutrals, or solid grounded wye neutrals/corner grounded delta configurations designed to reduce common mode noise on the motor cables. Furthermore, it is contemplated that an auto-transformer may be used to compensate for voltage drops across the filter inductors 40.

Figure 6:
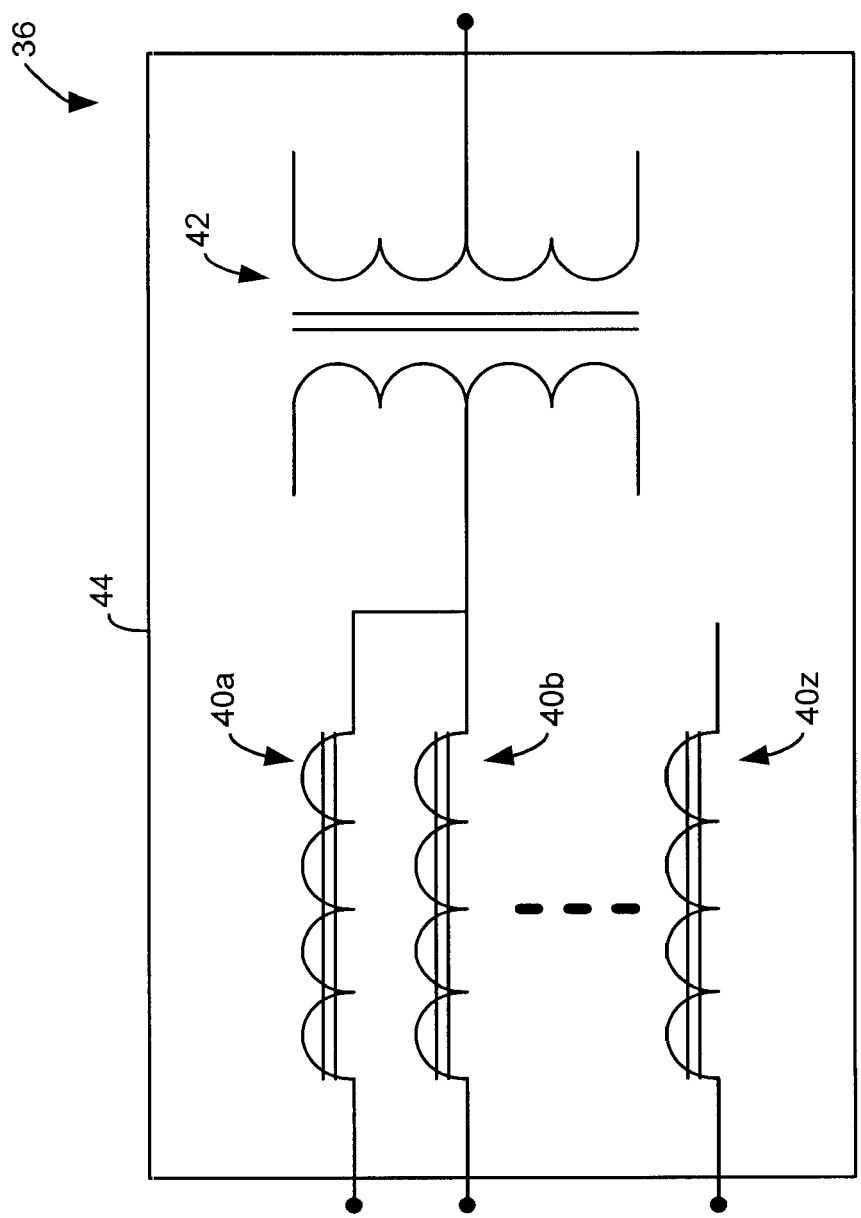
FIG. 6 is a single phase circuit diagram representation of the integrated filter and transformer device of FIG. 1 including multiple line reactors for connection to parallel inverter outputs.

While the above-described configurations include a (single- or three-phase) line filter inductor 40, a wide variety of filter types and configurations may be integrated within the housing 44. For example, referring now to FIG. 6, it is contemplated that multiple line reactors 40a, 40b, 40z may be integrated within the housing 44 and coupled to the transformer 42, such as is desirable when motor drive units are employed that include multiple, parallel inverters. The reactors prevent circulating current between parallel inverters and also help to balance fundamental current supplied by each voltage source inverter in parallel.

As described above, the filter inductor and transformer are not only commonly located in a housing 44 but actually share a common core 48. By doing so, the overall size of the combined filter inductor 40 and transformer 42 may be reduced. In particular, referring to FIG. 7a, in the case of a three-phase system, by sharing a common core 48, the overall size of the filter inductor 40 and transformer 42 can be reduced since the top three-phase leg of filter inductor 40 can be eliminated and integrated into the bottom leg 70 of the three-phase transformer 42 on the common core 48. That is, by sharing a common core 48, a leg 70 of the core 48 is common to both the filter 40 and the transformer 42; thus, eliminating the need for one of the legs that would be included if separate cores were used. This shared leg 70 may be interleaved with each phase leg 71a, 71b, 71c to isolate the filter inductor 40 and the transformer 42 from the magnetic flux of the other. Alternatively, referring to FIG. 7b, it is also contemplated that an E-core 76 may be used to form the core of the filter 40, which is then interleaved with the phase legs 71a, 71b, 71c of the transformer 42.

Figure 7A:
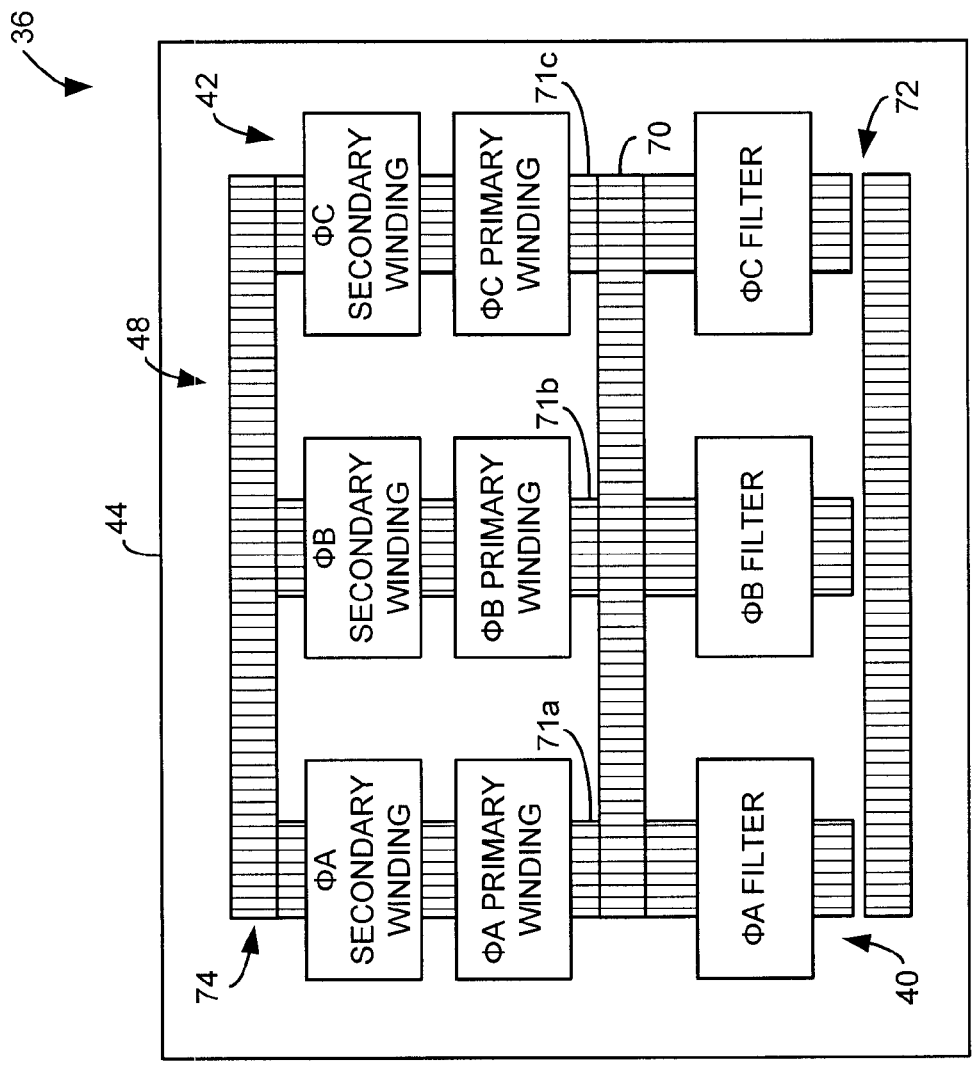
FIG. 7a is a schematic representation of a three-phase integrated filter and transformer device having a common metal core arranged according to a first configuration.
Figure 7B:
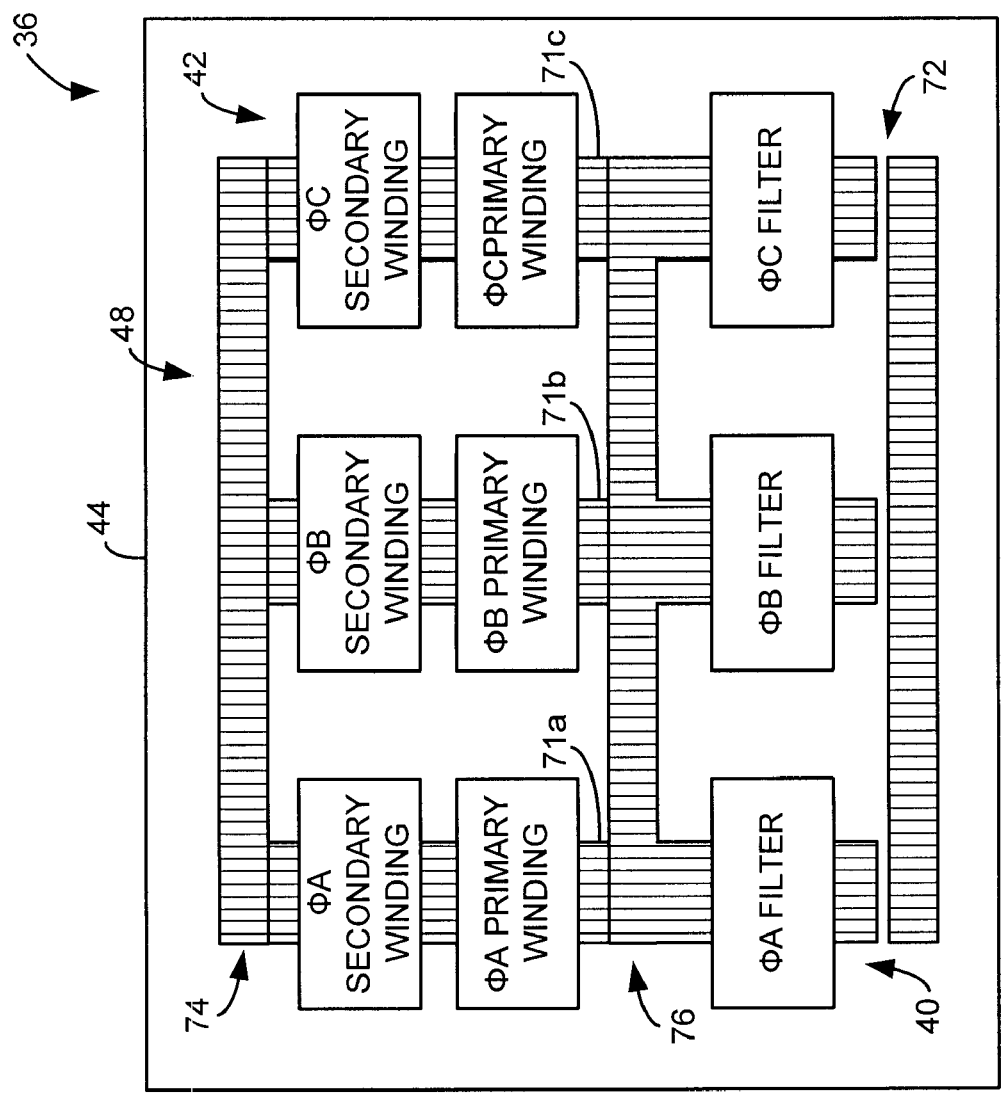
FIG. 7b is a schematic representation of a three-phase integrated filter and transformer device having a common metal core arranged according to another configuration, in which the filter inductor section contains an E-type core lamination and gap on the "I" section of the reactor core section.

Another feature of the common core 48 is an air gap 72 that is designed to keep the filter 40 within a linear operational range and protect against saturation. While FIG. 7a shows the air gap 72 arranged proximate to the filter inductor 40 and away from the transformer 42, it may also be formed between the filter inductor 40 and the transformer 42. That is, it is contemplated that the air gap 72 may be arranged on in each phase leg of the filter inductor 40.

Opposite the air gap 72, the common core 48 may include a butt gap or a set of interleaved laminations that close the core 48 near the transformer 42 so that it can withstand DC offset currents. Such lamination termination configurations are known in the art. Additionally, in the case of interleaved laminations 74, core losses are advantageously controlled.

Figure 7C:
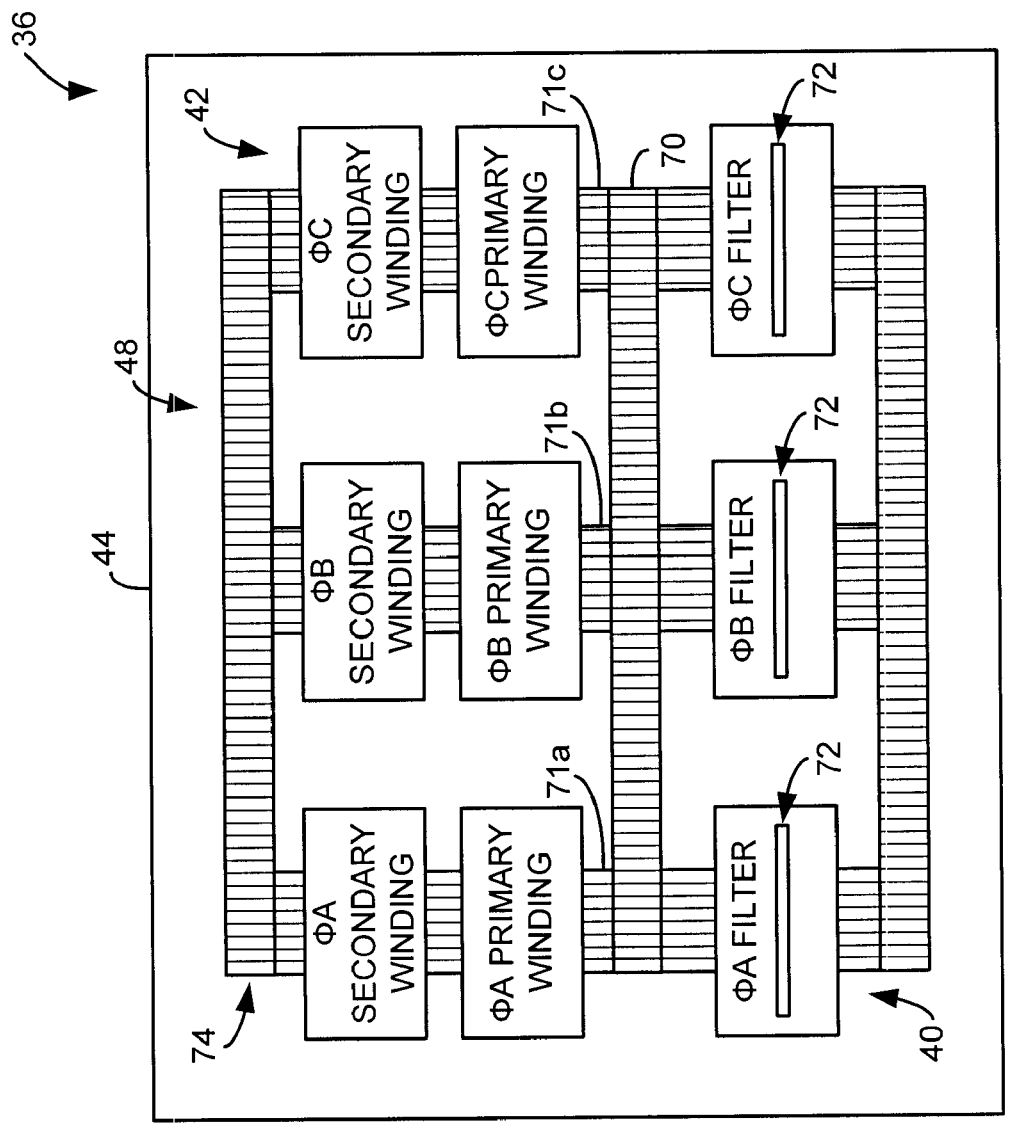
FIG. 7c is a schematic representation of a three-phase integrated filter and transformer device having a common metal core arranged according to yet another configuration, in which the reactor gap is arranged in the middle core section of the filter inductor.

Referring now to FIG. 7c, rather than including the air gap 72 on one side of the filter inductor 40, it is contemplated that the air gap 72 may be formed within a portion of the core 48 located within the filter inductor 40. In particular, it is contemplated that the air gap 72 may be formed within the core 48 and aligned with a gap 78 formed in the windings of the filter inductor 40. Also, by arranging the air gap 72 within the filter inductor 40 and away from the transformer 42, the air gap 72 further limits fringing flux that could otherwise enter the housing 44 from the filter inductor 40. As such, the amount of separation required between the housing 44 and combined filter inductor 40/transformer 42 may be further reduced.

Figure 7D:
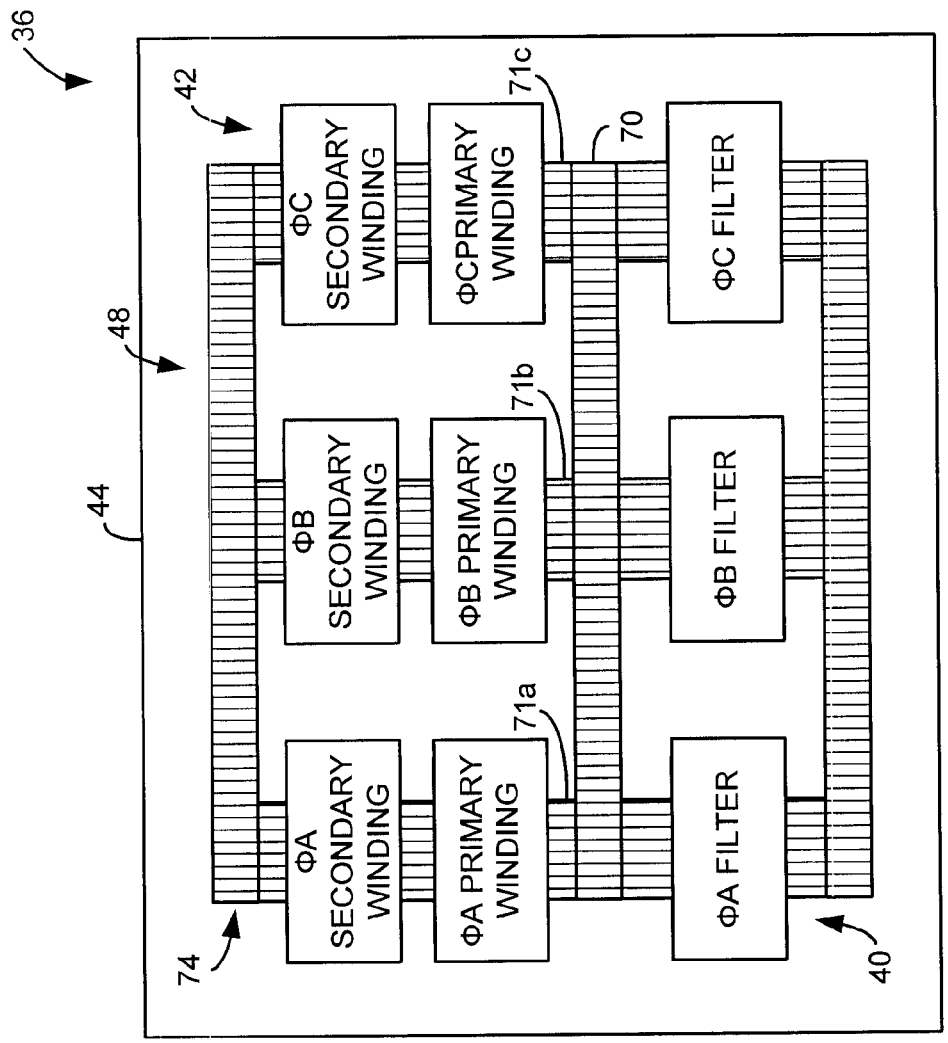
FIG. 7d is a schematic representation of a three-phase integrated filter and transformer device having a common metal core arranged according to still another configuration.

However, referring now to FIG. 7d, in some arrangements, such as when the filter inductor 40 will be used under conditions that would not cause saturation, the air gap may be eliminated. That is, while the elimination of the air gap will cause the filter inductor 40 to operate as a non-linear reactor, such a configuration may be desirable when the system will not be used under conditions that could cause the filter inductor 40 to saturate.

While FIGS. 7a through 7d illustrate three-phase systems, it is likewise contemplated that single-phase systems may be utilized in a similar manner. Additionally, other variations are contemplated, such as integrating course and fine tap switches into the transformer primary and secondary windings or, as described above, various additional taps may be included, such as a tapped primary windings of the transformer 42.

Therefore, the above-described system provides an integrated power conditioning system for delivering power suitable for driving a motor that may be enclosed in a common housing. Accordingly, while the motor drive unit may still be arranged separately from the motor and motor load, the filter inductor and transformer may be arranged together in a single housing with external filter resistors capacitors or inductors. Hence, various cost, size, and power consumption savings can be realized, as well as use of only a single thermal cooling and electrically insulating medium. For example, the integrated filter and transformer may advantageously share a common core having any of a variety of shared features.

The above-described system is particularly advantageous when used with low-voltage drive systems that are designed to feed medium-voltage motors or motors with long cables that are susceptible to reflected wave and common mode noise. Furthermore, the above-described system provides a transformer configuration that is capable of handling DC offsets and low frequency sub-harmonics often associated with the output of PWM inverter motor drives.

The present invention has been described in terms of the preferred embodiments, and it should be appreciated that many equivalents, alternatives, variations, and modifications, aside from those expressly stated, are possible and within the scope of the invention. Therefore, the invention should not be limited to a particular described embodiment.

We claim:

1. A device for conditioning power delivered to operate a motor comprising:
   a sealed housing having at least one input terminal extending through the housing and configured to receive an input power and at least one output terminal extending through the housing and configured to deliver an output power conditioned to power a motor coupled to the output terminal;

a filter arranged in the housing and having an input configured to receive the input power from the input terminal, wherein the filter is further configured to suppress voltage changes in the input power and deliver a filtered power to an output of the filter;

a transformer arranged in the housing and having an input configured to receive the filtered power from the output of the filter, wherein the transformer is at least configured to electrically isolate the input terminal from the output terminal and deliver a conditioned power from an output of the transformer to the output terminal to power the motor coupled to the output terminal; and a shared magnetic core extending through the filter and the transformer, the shared magnetic core including at least one gap formed in a portion of the core located within the filter.

2. The device of claim 1 wherein the shared magnetic core includes a gap arranged proximate to one of the input and the output of the filter to protect the filter against saturation.

3. The device of claim 1 wherein the shared magnetic core includes at least one of a butt gap and an interleaved lamination junction formed proximate to at least one of the input and the output of the transformer to control magnetic flux through the shared magnetic core caused by direct current (DC) power included in the filtered power.

4. The device of claim 1 further comprising at least one gap formed in a filter inductor phase leg to control magnetic flux against entering the housing.

5. The device of claim 1 further comprising an isolation material arranged in the housing to surround the filter and transformer.

6. The device of claim 5 wherein the isolation material includes oil configured to isolate and cool cores of the filter inductor and transformer.

7. The device of claim 1 wherein the filter and transformer include multiple phase windings and wherein the common metal core includes a plurality of interleaved laminations extending transversely across common phases of the filter inductor and the transformer.

8. The device of claim 7 wherein the interleaved laminations extend between the output of the filter and the input of the transformer and proximate to the output of the transformer.

9. The device of claim 1 further comprising at least one gap formed in the common metal core proximate to the filter inductor to protect the filter against saturation and at least one butt gap formed in the common metal core proximate to the transformer to protect the transformer against saturation caused by a DC offset in the filtered power.

10. The device of claim 9 wherein the at least one gap formed in the common metal core is arranged proximate to the input of the filter and the butt gap is arranged proximate to output of the transformer.

11. The device of claim 10 further comprising another butt gap formed in the common metal core and arranged proximate to input of the transformer.

12. The device of claim 1 wherein the filter includes at least one of a reactor, a combination reactor and parallel resistor, a combination reactor and series resistor-inductor-capacitor circuit, a combination reactor and at least one capacitor, and a combination of reactors.

13. The device of claim 12 wherein the housing further comprises a plurality of terminals configured to receive at least one of the parallel resistor, the series resistor-inductor-capacitor circuit, and the at least one capacitor arranged externally from the housing.

14. A power conditioning device configured to deliver power condition to drive a motor comprising:

a filter inductor having a plurality of windings extending from an input configured to receive unconditioned power to an output configured to deliver filtered power, wherein the plurality of windings are configured to suppress voltage changes in the unconditioned power;

a transformer having a set of primary windings configured to receive the filtered power from the output of the filter inductor and a set of secondary windings electrically isolated from the primary windings to deliver a conditioned power to power a motor coupled thereto; and a shared metal core extending through plurality of windings of the filter inductor and the primary windings and secondary windings of the transformer, the shared metal core including a gap formed in a portion of the core located within the plurality of windings of the filter inductor.

15. The device of claim 14 wherein the shared magnetic core includes a gap arranged proximate to the plurality of windings of the filter inductor to control saturation of the filter inductor.

16. The device of claim 14 wherein the shared magnetic core includes at least one of a butt gap and an interleaved lamination junction formed proximate to at least one of the primary windings and the secondary windings of the transformer to control magnetic flux through the shared magnetic core caused by DC power included in the filtered power.

17. The device of claim 14 further comprising a housing enclosing the filter inductor and the transformer and wherein the filter inductor includes at least one gap formed in the plurality of windings to control magnetic flux against entering the housing enclosing the filter inductor and the transformer.

18. The device of claim 17 further comprising an isolation material arranged in the housing to surround the filter inductor and the transformer.

19. The device of claim 18 wherein the isolation material includes oil configured to isolate and cool the filter inductor and the transformer.

20. The device of claim 14 wherein the filter inductor and the transformer include a set of windings for each of a plurality of phases and wherein the shared metal core extends coaxially through sets of windings of the filter inductor and the transformer that are common to a given phase and includes a plurality of interleaved laminations extending transversely across common phases of the filter inductor and the transformer.

21. The device of claim 20 wherein the interleaved laminations extend between the filter inductor and the primary windings of the transformer and proximate to the secondary windings of the transformer.

22. The device of claim 14 wherein the shared metal core includes at least one gap formed proximate to the windings of the filter inductor to protect the filter inductor against saturation and also includes at least one butt gap formed proximate to the secondary windings of the transformer to protect the transformer against saturation caused by a DC offset included in the filtered power.

23. The device of claim 22 wherein the at least one gap formed in the shared metal core is arranged proximate to the input of the filter inductor and the butt gap is arranged proximate to a coupling extending to the motor.

24. The device of claim 23 further comprising another butt gap formed in the shared metal core and arranged proximate to the output of the filter inductor.

25. A device for conditioning power delivered to operate a motor comprising:
- a housing having an interior and, an exterior and at least one input terminal extending from the interior to the exterior to receive an input power and at least one output terminal extending from the interior to the exterior to deliver an output power conditioned to power a motor coupled to the output terminal;
- a reactor arranged in the interior of the housing and having an input configured to receive the input power from the input terminal, wherein the reactor is further configured to suppress voltage changes in the input power and deliver a filtered power to an output of the reactor;
- a transformer arranged in the interior of the housing and having an input configured to receive the filtered power from the output of the reactor, wherein the transformer is at least configured to electrically isolate the input terminal from an output terminal and deliver a conditioned power from an output of the transformer to the output terminal to power the motor coupled to the output terminal; and
- a common metal core extending through the reactor and the transformer to couple magnetic flux therebetween, the common metal core including at least one gap formed in a portion of the core located within the reactor.

26. The device of claim 25 wherein the housing is environmentally sealed to protect components located in the interior from an environment located at the exterior.

27. The device of claim 25 further comprising a plurality of terminals extending from the exterior of the housing into the interior and a plurality of electrical connections extending from the terminals to the reactor and the transformer to allow selective reconfiguration of the device using the plurality of terminals.

* * * * *